United States Patent [19]

Bouruetaubertot et al.

[11] Patent Number: 5,397,758
[45] Date of Patent: Mar. 14, 1995

[54] ALUMINA-BASED COMPOSITIONS AND CATALYSTS HAVING HIGH SPECIFIC SURFACE AREA

[75] Inventors: Alain Bouruetaubertot, Paris; Thierry Chopin, St. Denis; Olivier Touret, Aubervilliers, all of France

[73] Assignee: Rhone-Poulenc Chimie, Courbevoie, France

[21] Appl. No.: 913,767

[22] Filed: Jun. 30, 1992

Related U.S. Application Data

[63] Continuation of Ser. No. 714,830, Jun. 13, 1991, abandoned.

[30] Foreign Application Priority Data

Jun. 13, 1990 [FR] France .................. 90 07322

[51] Int. Cl.6 .................. B01J 21/04; B01J 23/02; B01J 23/10; B01J 37/03
[52] U.S. Cl. .................. 502/303; 502/302; 502/304; 502/341; 502/439
[58] Field of Search ........... 502/302, 303, 304, 341, 502/439

[56] References Cited

U.S. PATENT DOCUMENTS

| | | |
|---|---|---|
| 2,432,286 | 12/1947 | Claussen et al. .................. 502/322 |
| 4,061,594 | 12/1977 | Michel et al. .................. 252/462 |
| 4,181,532 | 1/1980 | Woodhead .................. 501/85 |
| 4,476,245 | 10/1984 | Siefert .................. 502/341 X |
| 4,548,709 | 10/1985 | Bowes et al. .................. 208/213 |
| 4,711,872 | 12/1987 | Kato et al. .................. 502/328 |
| 4,722,920 | 2/1988 | Kimura et al. .................. 502/439 |
| 4,738,947 | 4/1988 | Wan et al. .................. 502/304 |
| 4,868,150 | 9/1989 | Spooner et al. .................. 502/302 |

FOREIGN PATENT DOCUMENTS

| | | |
|---|---|---|
| 0254574 | 1/1988 | European Pat. Off. . |
| 0308140 | 3/1989 | European Pat. Off. . |
| 0349419 | 1/1990 | European Pat. Off. . |
| 1037502 | 7/1966 | United Kingdom . |

OTHER PUBLICATIONS

Chemical Abstract 66(6):25540b, Production of lanthanum aluminate by coprecipitation, A. M. Golub et al. (1967).
Chemical Abstract, 99(12):98113f, Synthesis of yttrium aluminates by the coprecipitations of hydroxides, Glushkova et al. (1983).
Chemical Abstract, 107(22):201444z, Cerium-aluminum composite oxide, S. Eiichi (1987).
Chemical Abstract, 104(14):112239g, JP-A-60-226,414 (1986).

*Primary Examiner*—Paul Lieberman
*Assistant Examiner*—Douglas J. McGinty
*Attorney, Agent, or Firm*—Burns, Doane, Swecker & Mathis

[57] ABSTRACT

Porous alumina-based compositions having high specific surface areas, well adopted for catalyst applications and prepared by precipitation/hydrothermal treatment/calcination technique, comprise an alumina matrix having from 10% to 50% by weight of at least one rare earth or alkaline earth metal second element dispersed therein, having a pore volume, corresponding to pores of a diameter less than 100 nm, ranging from 1.2 cm³/g, at least 80% of which corresponding to pores having a diameter ranging from 10 nm to 100 nm, after heat treatment at a temperature of 350° C. and having a pore volume, also corresponding to pores of a diameter less than 100 nm, ranging from 0.6 cm³/g to 1.5 cm³/g, at least 90% of which corresponding to pores having a diameter ranging from 20 nm to 100 nm, after heat treatment at a temperature of 1,200° C. for four hours.

31 Claims, 3 Drawing Sheets

- Fig. 1 -

ALUMINA-BASED COMPOSITIONS AND CATALYSTS HAVING HIGH SPECIFIC SURFACE AREA

CROSS-REFERENCE TO COMPANION APPLICATION

This application is a continuation, of application Ser. No. 07/714,830, filed Jun. 13, 1991, now abandoned.

Our copending application Ser. No. 07/714,584, filed concurrently herewith and assigned to the assignee hereof, abandoned in favor of application Ser. No. 07/900,776, pending.

BACKGROUND OF THE INVENTION

1. Field of the Invention

The present invention relates to novel alumina-based compositions, to processes for the preparation thereof, and to the use of such novel compositions as starting materials for the production of particular catalysts or catalyst supports.

This invention especially relates to novel alumina-based compositions having a high specific surface area provided by pores having an average diameter ranging from 10 nm to 100 nm.

2. Description of the Prior Art

Porous activated alumina has long been known to this art as a catalyst support, adsorbent, etc. In the field of heterogeneous catalysis and in particular of catalysis for the conversion of exhaust gases emanating from internal combustion engines, the alumina must have a high specific surface area which is stable to heat and, moreover, a porosity of suitable dimensions in order to permit, on the one hand, a good dispersion of the catalytic phase therein and, on the other, a good diffusion therethrough of the gases to be treated.

Numerous processes are also known to this art for the production of alumina in powder, gel or agglomerate form having a high specific surface area and possessing a substantially bimodal pore diameter distribution, namely, micropores having a diameter of less than or close to 10 nm and macropores having a diameter of more than 100 nm. For example, the porosity of an alumina agglomerate may be provided by addition of a pore generator (pore-forming agent) which decomposes during the heat treatment of the agglomerate, or by agglomeration processes of the filler/binder type, the filler being an alumina powder and the binder being an alumina gel. Processes are also known to this art for the production of alumina powder or gel having a high microporosity. However, the conditions under which these processes are carried out are very difficult to control.

In catalysis applications, the alumina is generally employed as a support on which catalytically active elements such as precious metals, molybdenum, vanadium, etc., and also other elements such as promoters, are impregnated. Exemplary thereof are the rare earths, which are conventionally used in the catalytic conversion of exhaust gases emanating from internal combustion engines as a stabilizer for the specific surface area of the alumina and/or as a promoter, for example by utilizing their redox properties, such as cerium.

Alumina is also used to produce a porous coating on a compact structure designated monolithic, is generally in honeycomb form and is shaped from either a refractory material such as a ceramic, or from metal. In this case, the catalytic compounds such as the precious metals or the other elements such as the promoters are impregnated onto the porous layer of the alumina, previously deposited onto the monolithic structure.

To date, these elements were impregnated on an alumina having specific morphological characteristics. These successive impregnations necessitate a heat treatment of the alumina which may influence its morphology. Moreover, the dispersion of the elements at the surface of the pores is not always homogeneous.

SUMMARY OF THE INVENTION

Accordingly, a major object of the present invention is the provision of novel compositions based on active alumina which have unique structural characteristics, which are well adopted for catalysis applications, and which avoid or conspicuously ameliorate the above disadvantages and drawbacks to date characterizing the state of this art.

Briefly, the present invention features alumina-based compositions comprising at least one second element selected from among the rare earths and the alkaline earth metals, wherein the concentration by weight of said second element(s) in the compositions ranges from 10% to 50% and said compositions have a pore volume corresponding to pores of a diameter less than 100 nm ranging from 1.2 $cm^3/g$ to 3 $cm^3/g$, at least 80% of which correspond to pores having a diameter ranging from 10 nm to 100 nm, after a heat treatment at a temperature of 350° C., and a pore volume corresponding to pores of diameter less than 100 nm ranging from 0.6 to 1.5 $cm^3/g$, at least 90%, and preferably at least 95%, of which correspond to pores having a diameter ranging from 20 nm to 100 nm, after a heat treatment for four hours at 1,200° C.

DETAILED DESCRIPTION OF THE PREFERRED EMBODIMENTS OF THE INVENTION

More particularly according to the present invention, the concentration by weight of the at least one second element advantageously ranges from 15% to 40%.

By the term "rare earths" are intended the elements of the lanthanide group of the Periodic Table having atomic numbers ranging from 57 to 71 and yttrium, which has an atomic number of 39.

By "alkaline earth metals" are intended the elements beryllium, magnesium, calcium, strontium and barium.

In a preferred embodiment of the invention, the specific surface area of the compositions is at least 250 $m^2/g$ after a heat treatment at 350° C. for 2 hours and at least 25 $m^2/g$ and preferably ranging from 30 to 70 $m^2/g$ after a heat treatment at 1,200° C. for 4 hours.

The subject compositions comprise an alumina of pseudo-boehmite crystal structure, which is of pellicle morphology. This morphology is determined by M.E.T. and the structure of the composition is determined by X-ray diffraction analysis.

Figure 2:
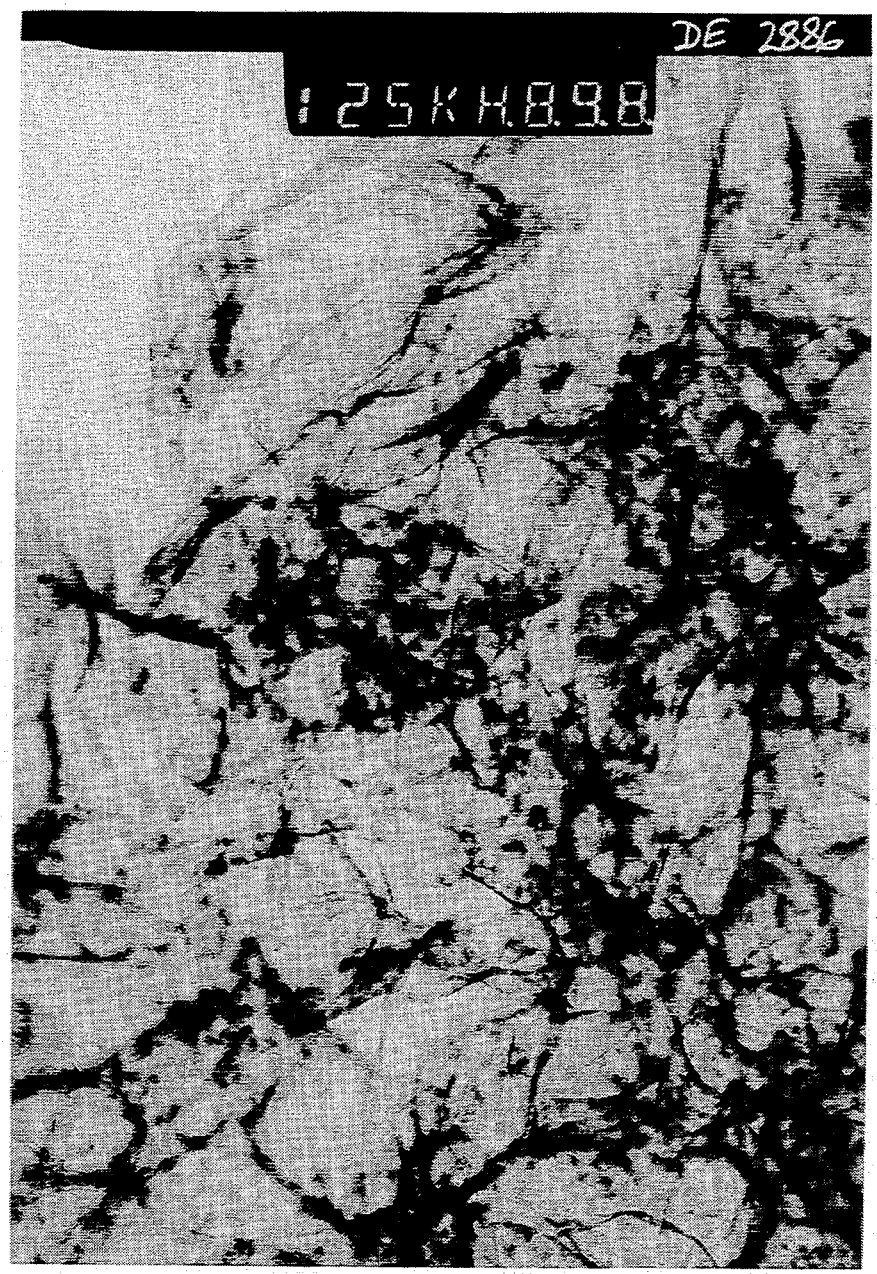
Figure 3:
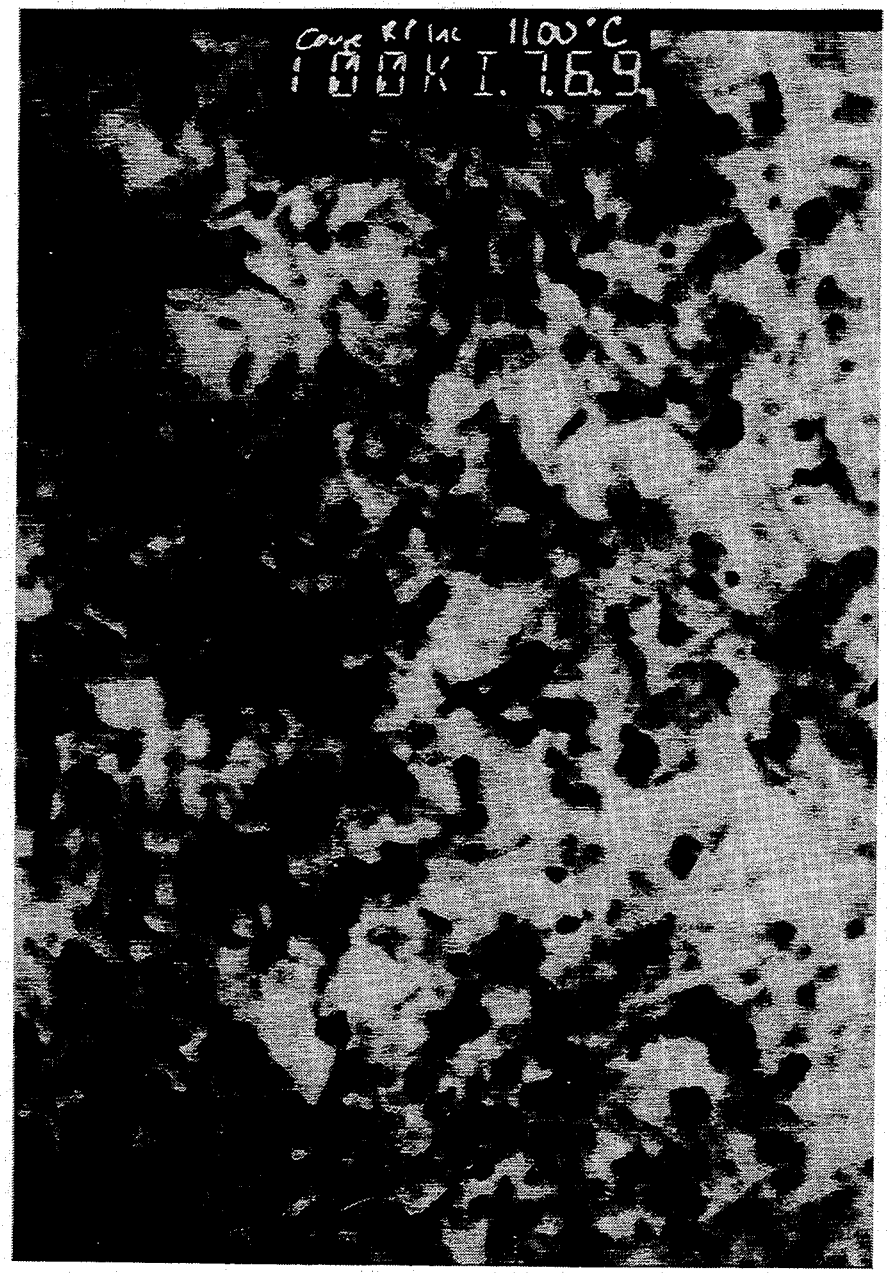

Moreover, these crystal analyses evidence that the second element is distributed in the form of crystallites of small dimensions between the pseudo-boehmite pellicles, as is clearly illustrated in the photomicrographs of FIGS. 2 and 3.

The size of the crystallites of the second element depends on the nature of such element. Thus, for cerium the size of the crystallites is on the order of 5.0 nm after a heat treatment at 400° C. for 2 hours, of 10.0 nm after a heat treatment at 850° C. for 2 hours and of 19 nm after a heat treatment at 1,100° C. for 4 hours.

This small size of the crystallites of the oxide of the second element after a heat treatment at high temperature is surprising and unexpected and permits a better dispersion and thus a better catalytic activity of this element.

Such dispersion of the oxide of the second element in the form of crystallites of small size permits, for example, an improvement in the exchange capacity with precious metals such as platinum during the impregnation of the latter, and provides for a very good dispersion of the latter.

It also permits, in particular in the case of cerium oxide, an improvement in the oxygen storage capacity of this oxide, as will clearly be seen in the examples below.

Suitable second elements include, for example, cerium, lanthanum, neodymium, barium, calcium, praseodymium or mixture thereof.

The size of the crystallites of the oxide of the second element is advantageously on the order of 5 nm (4 to 6 nm) after the composition has been subjected to a heat treatment at 400° C. for 2 hours, ranges from 7.5 to 13 nm after a heat treatment at 850° C. for 2 hours and ranges from 15 to 35 nm after a heat treatment at 1,100° C. for 4 hours.

The compositions of the invention can also comprise another element which exerts a stabilizing effect on the specific surface area of the alumina, ceria or both.

For example, the composition can contain lanthanum or barium cations which are known stabilizers. These cations can be added to the compositions by impregnating same, after calcination, with a solution of salts of lanthanum or barium, or by addition thereof to the solutions of aluminum and cerium prior to coprecipitation.

The compositions of the invention, which are in powder form, may be used to produce supports by agglomeration in the form of beads, which may be extruded, for example, or to produce porous coatings on a monolithic structure, or the like.

Thus, one of the preferred applications of the compositions of the invention is the production of a porous coating or washcoat on a honeycomb monolithic structure to form catalysts for the treatment of exhaust gases emanating from combustion engines.

For this application, the compositions of the invention are used either directly as a coating for a monolithic structure, for example a honeycomb structure fabricated from a ceramic, or as a mixture with active alumina in order to thus obtain a porous composition onto which catalytic elements may be deposited, for example by impregnation, in accordance with those techniques well known to this art. Thus, a catalytically active phase can be deposited into the pore volume of the alumina-based composition of the invention.

Depending on the desired catalyst and the nature of the catalytically active elements, certain of these elements are deposited onto alumina and others onto the compositions of the invention before mixing of these two constituents. These processes for the production of catalysts are also known to this art and are abundantly described in the literature, patents and otherwise.

The invention also features a process for the production of the alumina-based compositions described above.

This process comprises producing a solution of one or more soluble compounds of aluminum, for example a salt, with one or more compounds of the second element or elements, for example salts of such compounds.

Exemplary soluble compounds of aluminum include the chloride, nitrate and sulfate.

Exemplary soluble compounds of the second element include the nitrate, acetate and chloride.

In a first step, designated the precipitation step, a precipitating agent is mixed with the solution of soluble compounds. This precipitating agent contains carbonate, oxalate and/or carboxylate ions and hydroxyl ions.

In a preferred embodiment of the invention, the precipitating agent has a pH ranging from 3.5 to 9, advantageously from 4 to 8.

This precipitation solution is obtained by addition of an alkaline agent, for example a base, to a solution of carbonate or bicarbonate, for example.

Suitable such bases include the alkali metal or alkaline earth metal hydroxides and ammonia. The latter is preferred because the ammonium anion may be easily removed.

In another embodiment of the invention, the precipitation solution contains $(CO_3)^=$ and $OH^-$ ions in a $(CO_3)^=/OH^-$ ratio ranging from 0.25 to 4.

In yet another embodiment of the invention, and in particular when the second element is cerium, the latter is advantageously present in the form of cerium in the oxidation state $3+$.

The concentrations of aluminum and the at least one second element in the solution are not critical and may vary over wide limits. However, advantageously, the total concentration of aluminum and second element(s) ranges from 0.1 mol/l to 4 mol/l.

The concentration of the precipitating agent in the solution of precipitation is also not critical and is, in particular, limited by the solubility coefficients of the compounds used.

The admixing of the precipitation solution with the solution containing the aluminum compound may be carried out in any manner.

Such mixing is provided either by addition of the precipitation solution to the aluminum solution with stirring of the latter, or, conversely, by addition of the aluminum solution to the precipitation solution.

This mixing may be carried out continuously or discontinuously, at a temperature which may vary over wide limits; advantageously, the coprecipitation is effected at a temperature ranging from ambient temperature (15° C. to 25° C.) to 100° C., preferably from 20° C. to 60° C.

Moreover, the amount of solutions mixed or the flow rates of the solutions and concentrations of the species in these solutions are determined such that the amount of precipitating agent relative to the species to be precipitated (aluminum and second element) is at least equal to the stoichiometric amount and advantageously 5% to 10% greater than the stoichiometric amount.

In another embodiment of the invention, the coprecipitate is obtained by mixing a solution containing soluble aluminum and cerium salts with an ammonium carbonate solution, the pH of which has been adjusted by addition of ammonia.

The coprecipitate produced by the process of the invention comprises an alumina which is principally in amorphous form.

This alumina will be crystallized in pseudo-boehmite form, in particular during the "hydrothermal treatment" of the coprecipitate, which is also designated the precipitate aging or ripening step.

The precipitate obtained is then filtered. It may also be subjected to one or more washings. However, the latter are not mandatory.

In a second step, the precipitate is subjected to a hydrothermal treatment in order to develop the pseudo-boehmite crystalline phase.

The degree of development of this crystalline phase may extend to 80% to 100% of the alumina.

By the term "hydrothermal treatment" is intended maintaining the composition under defined conditions of temperature and pressure for such period of time sufficient for a crystalline phase to develop.

Thus, in one embodiment of the invention, this hydrothermal treatment is carried out by drying the precipitate with continuous removal of the vapors evolved.

This continuous removal of the vapors produced may be attained by drying under reduced pressure or atmospheric pressure with entrainment of the vapors in a stream of gas, for example a stream of air or inert gases (nitrogen) at the surface of or through the precipitate appropriately placed in an oven.

The temperature at which the precipitate is dried advantageously ranges from 50° C. to 150° C. This temperature will be higher, the higher the pressure.

For example, the pressure is typically below 10,000 Pa and advantageously ranges from 1,000 to 10,000 Pa.

The drying time is advantageously on the order of 1 hour to 100 hours.

In a second embodiment, the hydrothermal treatment is carried out at a temperature ranging from 30° C. to 100° C., either in the presence of water vapor at a pressure higher than atmospheric pressure or with the product being suspended or slurried in water. The duration of this treatment is advantageously less than 2 hours and preferably on the order of a few minutes to 1 hr, 30 min. The product obtained is then dried, either by the process described above (drying under vacuum or in an oven) or by rapid drying techniques, such as spraying.

The product treated and dried in this manner is then calcined at a temperature such as 300° C. to 1200° C.

This latter calcination operation may be carried out under widely varying conditions, depending upon the intended application of the alumina composition.

The product is analyzed in order to determine its composition, its structure and also its catalysis application properties, in particular for the production of a coating or washcoat on a monolithic structure.

In order to further illustrate the present invention and the advantages thereof, the following specific examples are given, it being understood that same are intended only as illustrative and in nowise limitative.

EXAMPLE 1

A precipitation was carried out continuously by mixing a solution containing cerium nitrate (0,068 mol/l) and aluminum nitrate (0.939 mol/l) and a solution containing ammonium carbonate (2,774 mol/l) and ammonia (0.882 mol.l).

The mixture was maintained at 25° C. for 1 hour before filtering off the coprecipitate.

The precipitate was washed with water in order to remove the nitrate ions.

The coprecipitate was then dried under vacuum under a pressure of 3,300 Pa at a temperature of 80° C. for a period of time of 1 to 100 hours.

The dried product was calcined for 2 hours at 350° C.

This product was analyzed in order to determine its structural and morphological characteristics. It contained 20% by weight of $CeO_2$ relative to the $CeO_2/Al_2O_3$ mixture.

After calcination at 350° C. for 2 hours, its specific surface area was 300 $m^2/g$ (determined by the BET method).

The pore volume was 1.6 $cm^3/g$ for pores having a diameter of less than 100 nm, of which 1.4 $cm^3/g$ was for pores having a diameter ranging from 10 to 100 nm (mesoporosity).

Figure 1:
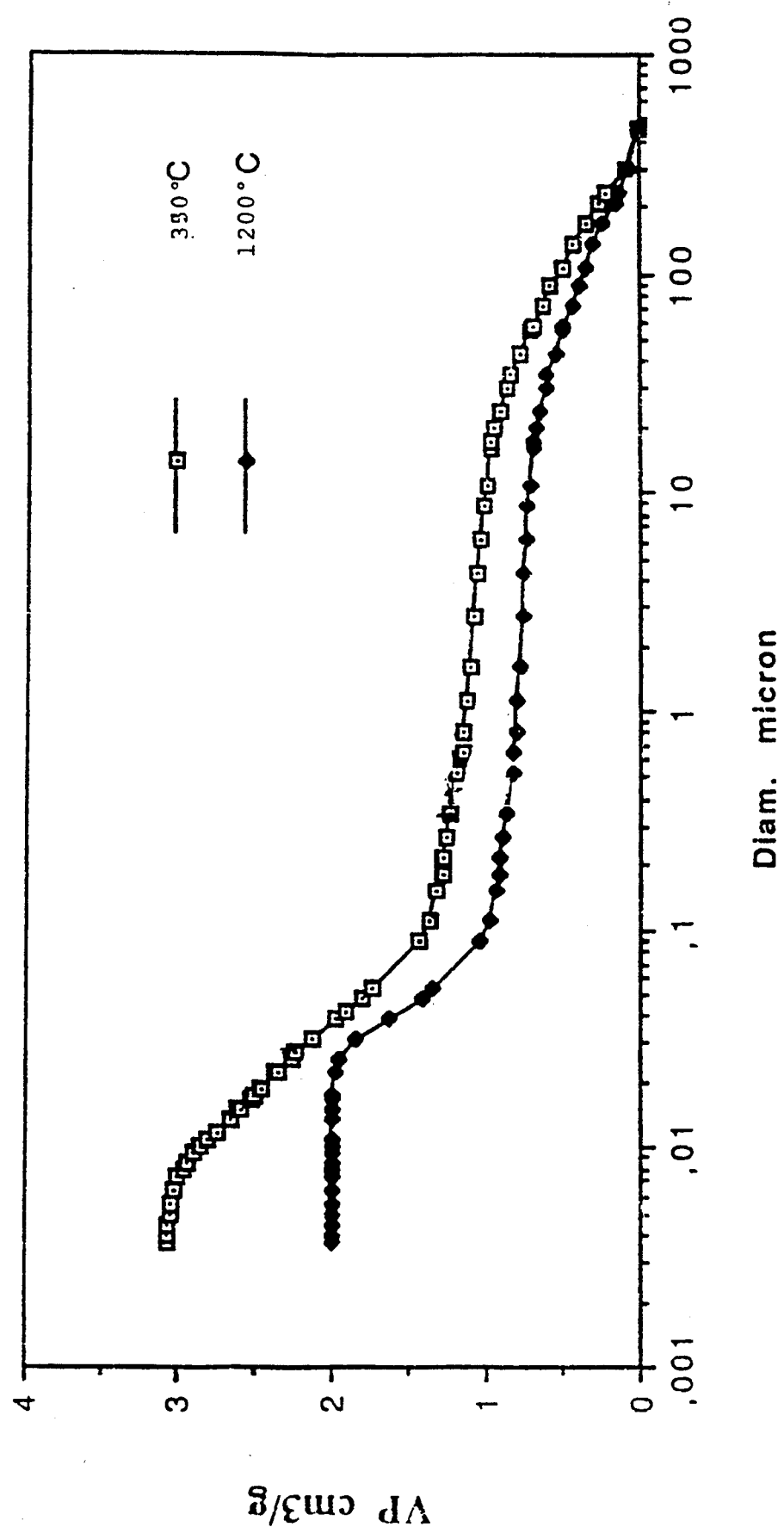

FIG. 1 illustrates the pore volume distribution of the material as a function of the pore diameters.

Morphological analysis of the product evidenced that the alumina was in the form of pseudo-boehmite in pellicles, the cerium oxide being present between the pellicles in the form of crystalline particles having an average diameter of about 5 nm (FIG. 2), determined by X-ray analysis.

The product calcined at 1,200° C. for 4 hours had a specific surface area of 48 $m^2/g$ and a pore volume of 1.2 $cm^3/g$ for pores having a diameter of less than 100 nm, 98% of which corresponded to pores having a diameter ranging from 20 nm to 100 nm. The structure of the material obtained is illustrated in the photomicrograph of FIG. 3.

EXAMPLE 2

This experiment was carried out using a mixture of a solution containing 1.862 mol/l of aluminum nitrate and 0.138 mol/l of cerium nitrate and a solution containing 2.773 mol/l of $NH_4HCO_3$ and 0.881 mol/l of ammonia.

The flow rate of the two solutions was adjusted in order to provide an $NH_4^+/NO_3^-$ ratio of about 1.05.

The precipitation was effected with stirring and at a temperature of 25° C. The mixture had a pH ranging from 5.6 to 6.3.

The precipitate was then washed with water. Washing enabled the $NO_3^-$ and $NH_4+$ ions present in the cake to be removed. Thus, the washing was advantageously continued as long as the concentration by weight of nitrate and ammonium in the precipitate was higher than 0.2%.

The precipitate thus collected was subjected to aging by reslurrying the precipitate in water (6% of precipitate) for 15 minutes at 100° C.

The product was then dried by spraying at 150° C. and then calcined at various temperatures.

The product obtained, which contained 20% of cerium, had a specific surface area of 320 $m^2/g$ after calcination for 2 hours at 350° C. and a pore volume of 1.5 $cm^3/g$ for pores having a diameter ranging from 10 nm to 100 nm (average diameter equal to 30 nm). This pore volume represented 30% of the total pore volume, but 85% of the pore volume of the pores of diameter less than 100 nm, the remainder of this volume corresponding to an intergranular porosity of diameter greater than 100 nm, which is not characteristic of the grain structure, but solely of the degree of compacting of the material.

Thus, after such a calcination at 1,200° C. for 4 hours, the specific surface area was 34 $m^2/g$ and the total pore volume 0.9 $cm^3/g$ for pores of diameter close to 40 nm (diameter ranging from 20 nm to 100 nm), representing 100% of the pore volume for pores having a diameter less than 100 nm.

EXAMPLE 3

The procedure Of Example 2 was repeated, but using a solution containing 0.032 mol/l of cerium nitrate and 0.973 mol/l of aluminum nitrate.

The precipitate obtained contained 10% by weight of $CeO_2$ and 90% of $Al_2O_3$.

The cerium particles had an average diameter of 5 nm in the product calcined at 400° C. for 4 hours.

After calcining at 1,200° C for 4 hours, this product had the following characteristics:

| | |
|---|---|
| Specific surface area: | 30 m²/g |
| Pore volume of pores of $\phi$ ranging from 20 nm to 100 nm: | 0.6 cm³/g |

(this pore volume represented 99% of the pore volume of pores of $\phi < 100$ nm).

The particles of cerium oxide dispersed in the alumina had a diameter of 35 nm after calcination at 1,100° C. for 4 hours.

EXAMPLE 4

The procedure of Example 1 was repeated, but using a barium nitrate mixed with the aluminum nitrate instead of a cerium nitrate. The product obtained had a $BaO/Al_2O_3$ mass ratio of 10%.

After calcining at 1,200° C. for 4 hours, this product had the following characteristics:

| | |
|---|---|
| Specific surface area: | 65 m²/g |
| Total pore volume: | 1.8 cm³/g |
| Pore volume of pores of $\phi$ ranging from 20 nm to 100 nm: | 0.8 cm³/g |

(this pore volume represented 99% of the pore volume of pores of $\phi < 100$ nm).

EXAMPLE 5

The procedure of Example 1 was repeated, but using a cerium chloride instead of the cerium nitrate. The solution contained 0.073 mol/l of cerium chloride and 0.932 mol/l of aluminum chloride. The precipitation solution contained 0.2774 mol/l of $NH_4HCO_3$ and 0.882 mol/l of ammonia.

After calcining at 1,200° C. for 4 hours, the product, which contained 20% by weight of cerium, had the following characteristics:

| | |
|---|---|
| Specific surface area: | 42 m²/g |
| Total pore volume: | 2 cm³/g |
| Pore volume of pores of $\phi$ ranging from 20 nm to 100 nm: | 1 cm³/g |

(this pore volume represented 99% of the pore volume of pores of $\phi < 100$ nm).

EXAMPLE 6

The procedure of Example 2 was repeated, but using a praseodymium nitrate instead of the cerium nitrate.

After calcination at 1,200° C. for 4 hours, the product obtained, which contained 20% of $Pr_2O_3$, had the following characteristics:

| | |
|---|---|
| Specific surface area: | 43 m²/g |
| Total pore volume: | 1 cm³/g |
| Pore volume of pores of $\phi$ ranging from 10 nm to 100 nm: | 0.8 cm³/g |

(this pore volume represented 99% of the pore volume of pores of $\phi < 100$ nm).

EXAMPLE 7 (COMPARATIVE)

The procedure of Example 2 was repeated, but using a solution containing only 3.65 mol/l of ammonia, without carbonate.

The coprecipitate obtained had a specific surface area of 250 m²/g after calcination at 350° C. for 2 hours, pores of average diameter of about 8 nm and a specific surface area of 3.5 m²/g after calcination at 1,200° C. for 4 hours.

Determination of the oxygen storage capacities:

In order to assess the difference in catalytic property and in particular the advantage provided by the material and the process of the invention, the oxygen storage capacity of the material was determined by the following test:

A mass of material (0.3 g) was subjected to a flow of gas, of helium under 2 bar, and at a flow rate of 10 l/h.

Either carbon monoxide (CO) at a concentration of 5% or oxygen at a concentration of 2.5% was injected in pulsed manner into this carrier gas.

The test was carried out in accordance with the following sequence:

(i) temperature increase to 400° C. under helium,
(ii) initiating a series of pulses of oxygen,
(iii) initiating a series of pulses of CO,
(iv) initiating an additional series of pulses Of $O_2$,
(v) initiating alternating pulses of CO and $O_2$.

The following were measured in order to determine and assess the storage capacity:

(a) the percentage of CO converted during the first pulse of the series of pulses of CO,
(b) cumulative conversion of CO per gram of $CeO_2$ after the series of pulses of CO,
(c) average consumption of CO per gram of $CeO_2$ for each pulse of the series of alternate pulses of CO and $O_2$.

Two materials were tested:

(1) Material A according to the invention (Example 1) calcined at 850° C., and
(2) Material B obtained by mixing an alumina gel (marketed under the trademark VERSAL 250) with a cerium oxide hydrate. The product obtained was dried and calcined at 850° C.

The results are reported in the following Table I

TABLE I

| MATERIAL | During the first series of pulses | | Cumulative consumption | | Alternating | |
|---|---|---|---|---|---|---|
| | % CO converted in the first pulse | mlCO/gCeO$_2$ | mlCO/gCeO$_2$ | CeOx | mlCO/CeO$_2$ | CeOx |
| A | 23.4% | 5.85 | 10.85 | x: 1.91 | 5.94 | 1.95 |
| B | 9.7% | 2.43 | 4.63 | x: 1.96 | 2.68 | 1.98 |

These results clearly demonstrate that the amount of oxygen stored by the cerium oxide, i.e., available for conversion of carbon monoxide into carbon dioxide was greater with material A according to the invention.

Determination of the platinum-fixing capacity:

The exchange capacity of the oxide of the second element, in particular of cerium oxide, with respect to platinum depends mainly on the specific surface of this oxide.

Thus, it was possible to demonstrate the high dispersion of the cerium oxide in the compositions of the invention by impregnating the latter with platinum and determining the hydrogen chemisorbed on the latter.

The method for this test was as follows:

(i) the supports were calcined either at 400° C. or at 1,100° C., (ii) 10 g of support thus calcined were added to 25 ml of a 4 g/l solution of $H_2PtCl_6$, (iii) stirring of the mixture was continued for 3 hours, (iv) the suspension was filtered on a 1.2 nm Millipore membrane, (v) the liquid collected was measured by colorimetry to determine the amount of platinum fixed.

The support impregnated in this manner, dried and calcined at 400° C., was subjected to the following pretreatment:

(a) temperature increase up to 400° C. at 10°/min, while sweeping with argon, (b) reduction under pure hydrogen at 400° C. for 2 hours, (c) desorption under pure argon at 400° C. for 2 hours, (d) cooling to ambient temperature, while sweeping with pure argon.

The product conditioned in this manner was used to determine the chemisorption of hydrogen at ambient temperature using an $H_2$ (1%)/argon mixture.

The material was subjected to a flow of this gaseous mixture as long as hydrogen was sorbed onto said material (volume $H_1$).

This adsorption was followed by a desorption with a gaseous stream of argon as long as hydrogen was present in this gaseous stream.

A new hydrogen adsorption cycle was carried out using the same gaseous mixture (volume $H_2$).

The difference $H=H_1-H_2$ corresponds to the adsorption of a monolayer of hydrogen on the platinum metal only. This volume of hydrogen H enabled the surface area of the platinum directly accessible in the material to be estimated.

This volume H is also termed the volume (V) of hydrogen chemisorbed on the platinum.

From this result, the accessible surface area of platinum may be estimated using the equation:

$$S = Nsn\ V/Vm$$

in which:

S is the accessible surface of the platinum in m$^2$/g,

N is Avogadro's number, s is the area of an atom of metal ($8.41 \times 10^{-2}$), n is the stoichiometry of the reaction:

$$Pt + H_2 \rightleftharpoons 2Pt-H,$$

V is the volume of chemisorbed hydrogen (V=H), and

Vm is the volume of hydrogen.

The size of the platinum metal particles may also be estimated by assuming that the platinum crystallites are cubic or spherical in shape:

cubic shape: $a = 5/S$ hemispherical shape: $d = 6/S$ in which:

S is the accessible surface of the platinum, is the mass per unit volume of the platinum, a is the edge of the cube, and d is the diameter of the sphere.

The results obtained are reported in the following Table II:

TABLE II

| Sample | Pretreatment temperature | Mass of platinum dispersed | Volume (H) of chemisorbed platinum mlH$_2$/g of Pt | φ of Pt crystallite |
|---|---|---|---|---|
| Example 1 | 400° C. | 1% | 46.8 | 1.2 nm |
| | 1,100° C. | 1% | 50.67 | 1.1 nm |
| Example 7 Comparative | 400° C. | 1% | 49.7 | 1.1 nm |
| | 1,100° C. | 0% Impossible to impregnate 1% of platinum | — | — |

These results evidence that it was possible to fix platinum on the material of the invention after a heat treatment of said material at 1,100° C. In contrast, the comparative material of Example 7 obtained by impregnation of cerium on alumina does not permit a sufficient amount of platinum to be fixed after a pretreatment at 1,100° C.

This capacity for fixing platinum even after a treatment at high temperature is very important, in particular when the catalyst must be used at high temperatures such as, for example, in the treatment of exhaust gases emanating from internal combustion engines.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A porous alumina-based composition of matter, comprising an alumina matrix having from 10% to 50% by weight of at least one rare earth or alkaline earth metal second element dispersed therein, having a pore volume, corresponding to pores of a diameter less than 100 nm, ranging from 1.2 cm$^3$/g to 3 cm$^3$/g, at least 80% of which corresponding to pores having a diameter ranging from 10 nm to 100 nm, after heat treatment at a temperature of 350° C., and having a pore volume, also corresponding to pores of a diameter less than 100 nm, ranging from 0.6 cm$^3$/g to 1.5 cm$^3$/g, at least 90% of which corresponding to pores having a diameter ranging from 20 nm to 100 nm, after heat treatment at a temperature of 1,200° C. for four hours.

2. The alumina-based composition as defined by claim 1, having a specific surface area of at least 250 m$^2$/g after heat treatment at a temperature of 350° C. for two hours.

3. The alumina-based composition as defined by claim 1, having a specific surface area of at least 25 m$^2$/g after heat treatment at a temperature of 1,200° C. for four hours.

4. The alumina-based composition as defined by claim 3, having a specific surface area ranging from 30 to 70 m$^2$/g after heat treatment at a temperature of 1,200° C. for four hours.

5. The alumina-based composition as defined by claim 1, said at least one rare earth or alkaline earth metal second element comprising an oxide thereof.

6. The alumina-based composition as defined by claim 5, having from 15% to 40% by weight of said at least one rare earth or alkaline earth metal oxide dispersed in said alumina matrix.

7. The alumina-based composition as defined by claim 1, a major amount of said alumina matrix having a pseudo-boehmite crystalline structure.

8. The alumina-based composition as defined by claim 7, said pseudo-boehmite alumina crystals having pellicle morphology.

9. The alumina-based composition as defined by claim 8, said at least one rare earth or alkaline earth metal second element comprising crystallites thereof.

10. The alumina-based composition as defined by claim 9, said crystallites being distributed between said pseudo-boehmite alumina pellicles.

11. The alumina-based composition as defined by claim 10, said crystallites having a size ranging from 15 nm to 35 nm after calcination at 1,100° C.

12. The alumina-based composition as defined by claim 1, said at least one rare earth or alkaline earth metal second element comprising lanthanum, cerium, neodymium, praseodymium, barium, or mixture thereof.

13. The alumina-based composition as defined by claim 1, further comprising a stabilizing amount of lanthanum or barium cations.

14. The alumina-based composition as defined by claim 1, further comprising a catalytically active phase deposited into the pore volume thereof.

15. Admixture of the alumina-based composition as defined by claim 1 with active alumina.

16. A process for the preparation of a porous alumina-based composition of matter, comprising an alumina matrix having from 10% to 50% by weight of at least one rare earth or alkaline earth metal second element dispersed therein, having a pore volume, corresponding to pores of a diameter less than 100 nm, ranging from 1.2 cm$^3$/g to 3 cm$^3$/g, at least 80% of which corresponding to pores having a diameter ranging from 10 nm to 100 nm, after heat treatment at a temperature of 350° C., and having a pore volume, also corresponding to pores of a diameter less than 100 nm, ranging from 0.6 cm$^3$/g to 1.5 cm$^3$/g, at least 90% of which corresponding to pores having a diameter ranging from 20 nm to 100 nm, after heat treatment at a temperature of 1,200° C. for four hours, comprising (a) admixing a solution which includes at least one soluble compound of aluminum and at least one soluble compound of said at least one rare earth or alkaline earth metal with a solution of precipitation which includes hydroxyl ions and carbonate, oxalate and/or carboxyl ions, (b) separating therefrom the precipitate thus formed wherein alumina is in amorphous form, (c) hydrothermally treating said separated precipitate and transforming the amorphous alumina to pseudoboehmite form, (d) optionally drying the hydrothermally treated precipitate, and (e) calcining such precipitate.

17. The process as defined by claim 16, said solution of precipitation comprising ammonia and ammonium carbonate.

18. The process as defined by claim 16, said at least one soluble compound of aluminum comprising a nitrate, sulfate or chloride.

19. The process as defined by claim 16, said at least one soluble compound of said at least one rare earth or alkaline earth metal comprising a nitrate or chloride.

20. The process as defined by claim 16, said solution of precipitation comprising carbonate and hydroxyl ions in a $CO_3^=/OH^-$ ratio ranging from 0.25 to 4.

21. The process as defined by claim 16, said solution of precipitation having a pH ranging from 3.5 to 9.

22. The process as defined by claim 16, comprising hydrothermally treating said separated precipitate by drying same and continuously removing evolved vapors therefrom.

23. The process as defined by claim 16, comprising hydrothermally treating said separated precipitate under water vapor pressure at a temperature ranging from 30° to 100° C.

24. The process as defined by claim 16, comprising hydrothermally treating said precipitate by suspending same in water and maintaining the suspension at a temperature ranging from 30° to 100° C.

25. The process as defined by claim 16, comprising calcining the precipitate at a temperature ranging from 300° to 1,200° C.

26. A catalyst shaped article comprising a catalytically active phase deposited onto a support which comprises the alumina-based composition as defined by claim 1.

27. The catalyst shaped article as defined by claim 26, said support further comprising active alumina.

28. The alumina-based composition as defined by claim 1, having a pore volume of at least 0.8 cm$^3$/g after heat treatment at a temperature of 1200° C. for four hours, the pore volume corresponding to pores of which at least 90% have a diameter ranging from 20 nm to 100 nm.

29. The alumina-based composition as defined by claim 1, having a pore volume of at least 0.9 cm$^3$/g after heat treatment at a temperature of 1200° C. for four hours, the pore volume corresponding to pores of which at least 90% have a diameter ranging from 20 nm to 100 nm.

30. A porous alumina-based composition of matter, comprising an alumina matrix having from 10% to 50% by weight of at least one rare earth or alkaline earth metal second element dispersed therein, having a pore volume, corresponding to pores of a diameter less than 100 nm, ranging from 1.2 cm$^3$/g to 3 cm$^3$/g, at least 80% of which corresponding to pores having a diameter ranging from 10 nm to 100 nm, after heat treatment at a temperature of 350° C., and having a pore volume, also corresponding to pores of a diameter less than 100 nm, ranging from 0.6 cm$^3$/g to 1.5 cm$^3$/g, at least 90% of which corresponding to pores having a diameter ranging from 20 nm to 100 nm, after heat treatment at a temperature of 1,200° C. for four hours, said second element being distributed in the form of small crystallites in the alumina matrix.

31. A porous alumina-based composition of matter, comprising an alumina matrix having from 10% to 50% by weight of at least one rare earth or alkaline earth metal second element dispersed therein, having a pore volume, corresponding to pores of a diameter less than 100 nm, ranging from 1.2 cm$^3$/g to 3 cm$^3$/g, at least 80% of which corresponding to pores having a diameter ranging from 10 nm to 100 nm, after heat treatment at a temperature of 350° C., and having a pore volume, also corresponding to pores of a diameter less than 100 nm, ranging from 0.6 cm$^3$/g to 1.5 cm$^3$/g, at least 90% of which corresponding to pores having a diameter ranging from 20 nm to 100 nm, after heat treatment at a temperature of 1,200° C. for four hours, a major amount of said alumina matrix having a pseudo-boehmite crystalline structure and said second element being distributed in the form of small crystallites in the alumina matrix.

* * * * *